(12) United States Patent
Tomita et al.

(10) Patent No.: US 11,186,964 B2
(45) Date of Patent: Nov. 30, 2021

(54) SHOVEL (71) Applicant: SUMITOMO(S.H.I.) CONSTRUCTION MACHINERY CO., LTD., Tokyo (JP)

(72) Inventors: Kouichiro Tomita, Chiba (JP); Hajime Aragaki, Chiba (JP); Ryuji Shiratani, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/021,648

(22) Filed: Jun. 28, 2018

(65) Prior Publication Data

US 2018/0305893 A1 Oct. 25, 2018

Related U.S. Application Data

(63) Continuation of application No. PCT/JP2016/088948, filed on Dec. 27, 2016.

(30) Foreign Application Priority Data

Dec. 28, 2015 (JP) .............................. JP2015-256685

(51) Int. Cl.
*B60R 1/00* (2006.01)
*H04N 7/18* (2006.01)
(Continued)

(52) U.S. Cl.
CPC ............... *E02F 5/145* (2013.01); *B60R 1/00* (2013.01); *E02F 9/24* (2013.01); *E02F 9/26* (2013.01);
(Continued)

(58) Field of Classification Search
None
See application file for complete search history.

(56) References Cited

U.S. PATENT DOCUMENTS 9,734,413 B2 * 8/2017 Ichikawa ............... E01C 23/163
2002/0003571 A1 * 1/2002 Schofield ............ B60R 11/0235
348/148

(Continued)

FOREIGN PATENT DOCUMENTS

EP 1077161 2/2001
EP 2617903 7/2013
(Continued)

OTHER PUBLICATIONS

International Search Report for PCT/JP2016/088948 dated Mar. 28, 2017.

*Primary Examiner* — Kate H Luo
(74) *Attorney, Agent, or Firm* — IPUSA, PLLC (57) ABSTRACT

A shovel includes a lower traveling body, an upper rotating body rotatably mounted on the lower traveling body, a cab mounted on the upper rotating body, a left monitor mounted on a left pillar inside the cab, a right monitor mounted on a right pillar inside the cab, a left camera configured to capture an image of an area on a left side of the upper rotating body, a right camera configured to capture an image of an area on a right side of the upper rotating body, and a controller configured to control both the left monitor and the right monitor. The controller is configured to cause the left monitor to continuously display a mirror image generated from the image captured by the left camera, and to cause the right monitor to continuously display a mirror image generated from the image captured by the right camera.

14 Claims, 6 Drawing Sheets

(51) Int. Cl.
*E02F 5/14* (2006.01)
*E02F 9/24* (2006.01)
*E02F 9/26* (2006.01)

(52) U.S. Cl.
CPC .......... *H04N 7/18* (2013.01); *B60R 2300/105* (2013.01); *B60R 2300/8026* (2013.01)

(56) References Cited

U.S. PATENT DOCUMENTS

| | | | |
|---|---|---|---|
| 2005/0151845 A1* | 7/2005 | Tsukada | E02F 9/26 348/148 |
| 2008/0055411 A1* | 3/2008 | Lee | B60R 1/00 348/148 |
| 2011/0025848 A1* | 2/2011 | Yumiba | B62D 15/029 348/148 |
| 2013/0033495 A1* | 2/2013 | Kiyota | E02F 9/261 345/420 |
| 2013/0169690 A1* | 7/2013 | Gotou | G09G 5/373 345/660 |
| 2014/0375814 A1* | 12/2014 | Ishimoto | E02F 9/24 348/148 |
| 2015/0138360 A1* | 5/2015 | Kowatari | B60R 1/00 348/148 |
| 2015/0368881 A1* | 12/2015 | Baeumchen | E02F 3/32 348/148 |

FOREIGN PATENT DOCUMENTS

| | | |
|---|---|---|
| EP | 2647772 | 10/2013 |
| JP | 2001-140286 | 5/2001 |
| JP | 3351984 | 12/2002 |
| JP | 2005-138751 | 6/2005 |
| JP | 2005-328181 | 11/2005 |
| JP | 2006-298171 | 11/2006 |
| JP | 3966657 | 8/2007 |
| JP | 2007-278025 | 10/2007 |
| JP | 2009-113561 | 5/2009 |
| JP | 2010-070929 | 4/2010 |
| JP | 2010-112100 | 5/2010 |
| JP | 2010-121270 | 6/2010 |
| JP | 2012-117225 | 6/2012 |
| JP | 2013-002101 | 1/2013 |
| JP | 2013-187562 | 9/2013 |
| JP | 2013-253397 | 12/2013 |
| JP | 2014-116756 | 6/2014 |
| JP | 2015-055095 | 3/2015 |
| WO | 2015/098156 | 7/2015 |

\* cited by examiner

SHOVEL

CROSS-REFERENCE TO RELATED APPLICATION

The present application is a continuation application of International Application No. PCT/JP2016/088948, filed on Dec. 27, 2016, which claims priority to Japanese Patent Application No. 2015-256685, filed on Dec. 28, 2015, the entire content of each of which is incorporated herein by reference.

BACKGROUND

Technical Field

The disclosures herein generally relate to a shovel.

Description of Related Art

A shovel to which a right rear-view mirror is attached is known. The right rear-view mirror allows an operator to visually check the right rear of an upper rotating body.

Such a shovel allows an operator in a cab of the shovel to visually check a blind spot of an upper rotating body of the shovel through a right rear-view mirror.

However, in order to visually check the blind spot of the upper rotating body, the operator's face needs to be turned to the direction of the right rear-view mirror (to the right side). Therefore, unless the operator looks away from the front and look into the right rear-view mirror, the operator is not able to visually check the blind spot. Further, as a boom exists between the cab and the right rear-view mirror, depending on boom angle, there may be a case where the operator may not be able to visually recognize the right rear-view mirror.

SUMMARY

According to an embodiment of the present invention, a shovel includes a lower traveling body, an upper rotating body rotatably mounted on the lower traveling body, a cab mounted on the upper rotating body, a left monitor mounted on a left pillar inside the cab, a right monitor mounted on a right pillar inside the cab, a left camera configured to capture an image of an area on a left side of the upper rotating body, a right camera configured to capture an image of an area on a right side of the upper rotating body, and a controller configured to control both the left monitor and the right monitor, wherein the controller is configured to cause the left monitor to continuously display a mirror image generated from the image captured by the left camera, and to cause the right monitor to continuously display a mirror image generated from the image captured by the right camera.

DETAILED DESCRIPTION

It is desirable to provide a shovel that allows an operator to visually check blind spots on sides of the shovel without looking away from the front and to intuitively recognize whether an object exists in the blind spots on the sides of the shovel.

According to at least one embodiment, an operator can check an image in the operator's field of view without looking away from the front while operating a shovel. Accordingly, it is possible to provide a shovel that allows the operator to visually check blind spots on sides of the shovel while operating the shovel and to intuitively recognize whether an object exists in the blind spots on the sides of the shovel.

In the following, embodiments of the present invention will be described with reference to the accompanying drawings. In the drawings, the same elements are denoted by the same reference numerals and a duplicate description thereof may be omitted.

Figure 1:
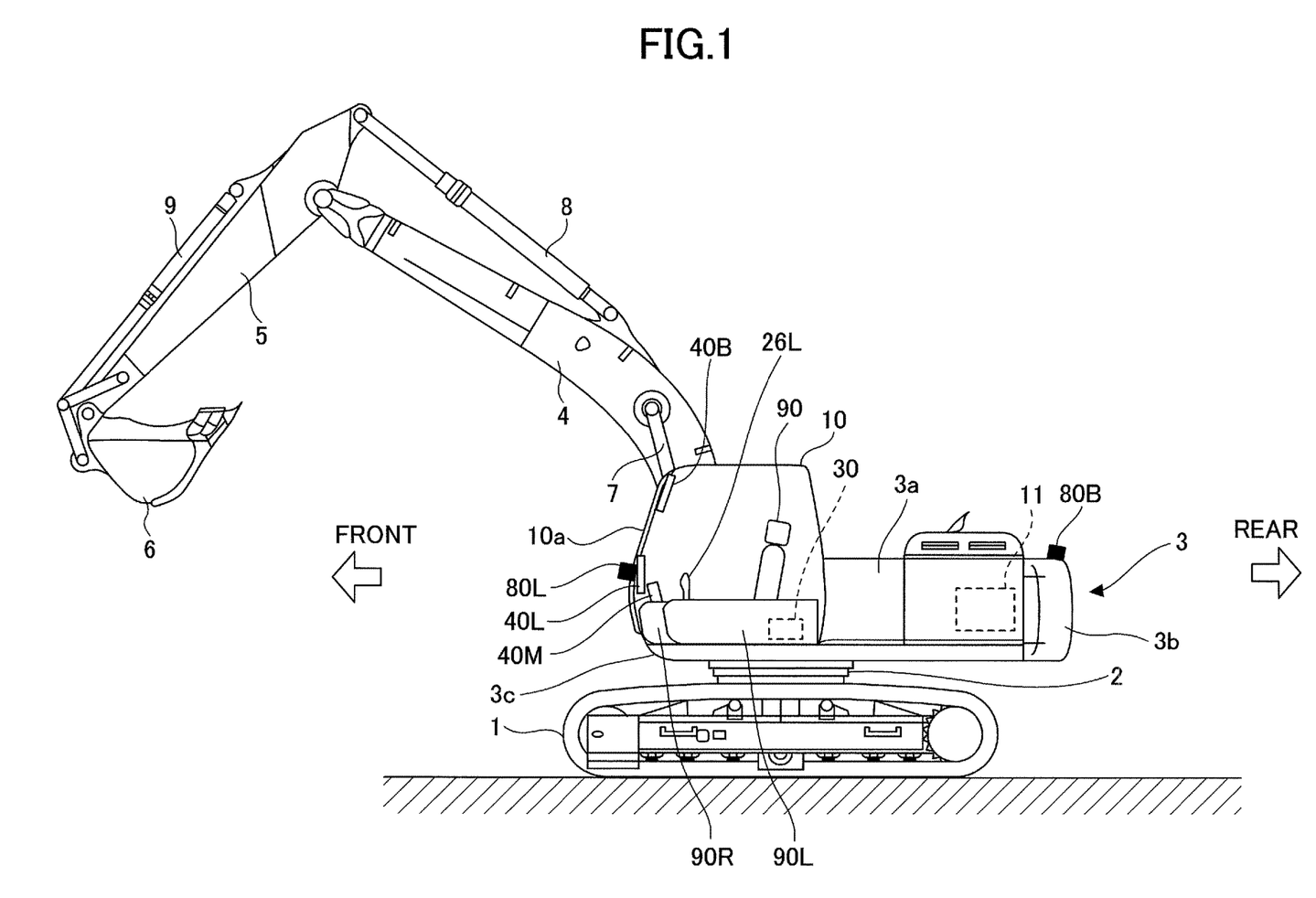
FIG. 1 is a left side view illustrating a shovel according to an embodiment of the present invention.

FIG. 1 is a left side view of a shovel according to an embodiment of the present invention. An upper rotating body 3 is rotatably mounted on a lower traveling body 1 of the shovel via a rotating mechanism 2. A boom 4 is mounted on the upper rotating body 3. An arm 5 is attached to the end of the boom 4, and a bucket 6 serving as an end attachment is attached to the end of the arm 5.

The boom 4, the arm 5, and the bucket 6 form an excavation attachment as an example of an attachment, and are hydraulically driven by a boom cylinder 7, an arm cylinder 8, and a bucket cylinder 9, respectively.

The upper rotating body 3 is mainly configured with a cover 3a, a counter weight 3b, and a platform 3c. A cabin 10 serving as a cab is mounted on a front portion of the platform 3c. Power sources such as an engine 11 are mounted on a rear portion of the platform 3c. The power sources such as the engine 11 are covered by the cover 3a, and the counter weight 3b is attached to a rear portion of the cover 3a. FIG. 1 transparently illustrates the inside of the cabin 10.

Figure 2:
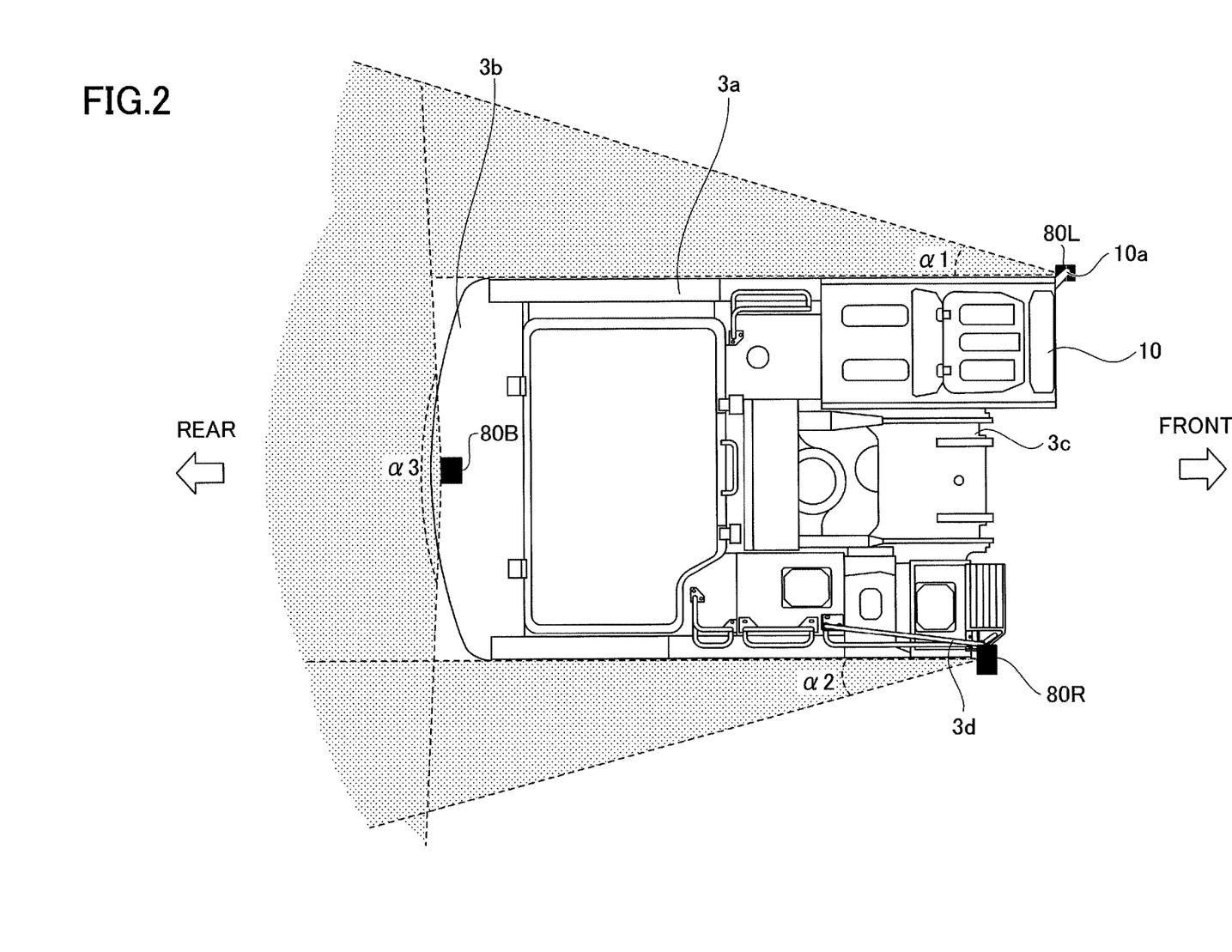
FIG. 2 is a top view illustrating an upper rotating body of the shovel of FIG. 1.
Figure 3:
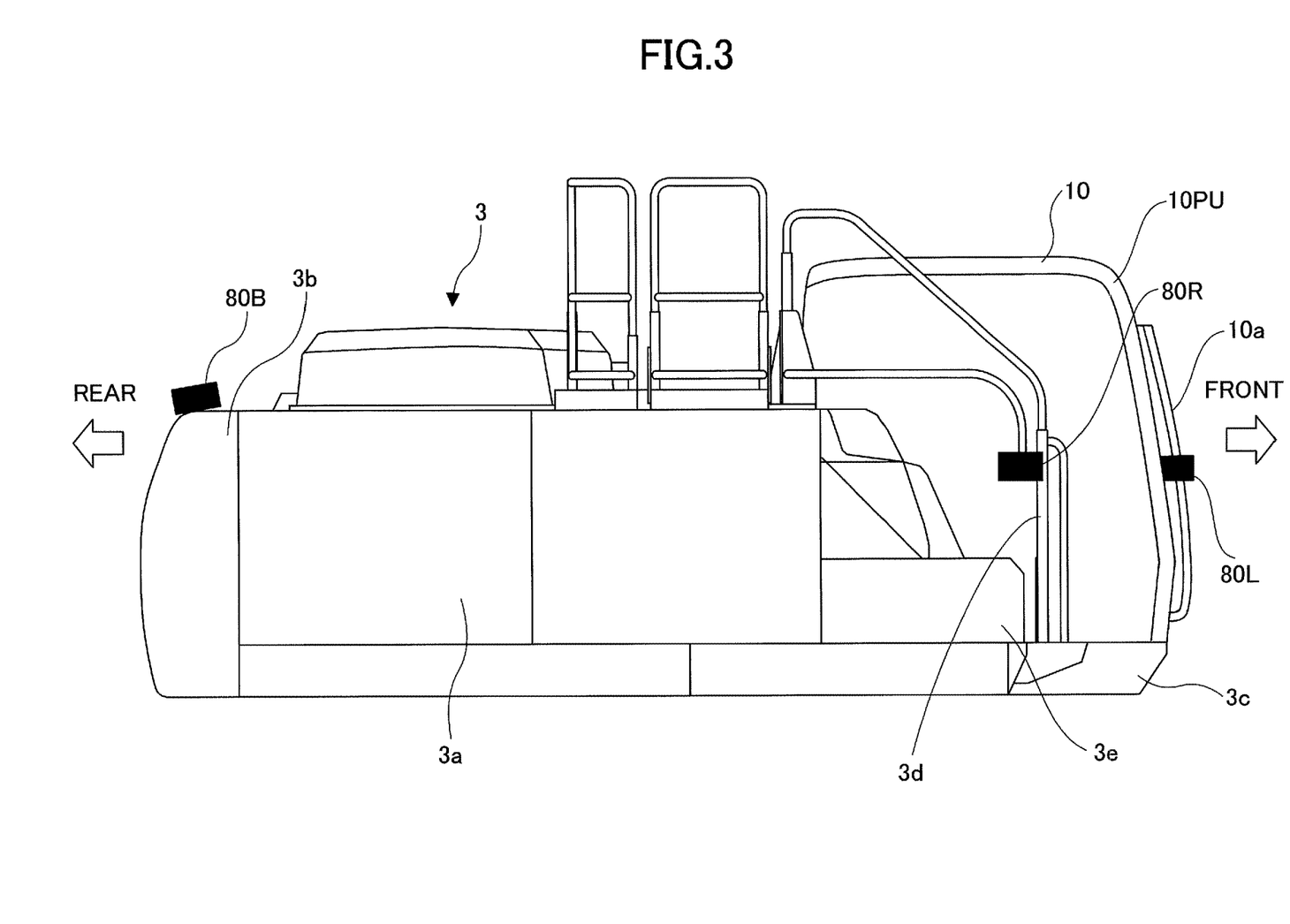
FIG. 3 is a right side view illustrating the upper rotating body of the shovel of FIG. 1.

FIG. 2 is a top view illustrating the upper rotating body 3 of the shovel of FIG. 1. FIG. 3 is a right side view illustrating the upper rotating body 3. In FIG. 2 and FIG. 3, the illustration of the excavation attachment is omitted for clarification purposes.

As illustrated in FIG. 1 through FIG. 3, a left camera 80L is mounted on a stay 10a on the left front side of the cabin 10. A back camera 80B is mounted on an upper portion of the counter weight 3b. A right camera 80R is mounted on a handrail 3d on the right front side of the upper rotating body 3.

As illustrated in FIG. 2, the left camera 80L is configured to have a horizontal angle of view $\alpha 1$ of 20 to 70 degrees, for example. Similarly, the right camera 80R is configured to have a horizontal angle of view $\alpha 2$ of 20 to 70 degrees, for example. Also, the back camera 80B is configured to have a horizontal angle of view $\alpha 3$ that is larger than the horizontal angle of view $\alpha 1$ of the left camera 80L and the horizontal angle of view $\alpha 2$ of the right camera 80R. For example, the horizontal angle of view $\alpha 3$ ranges from 150 to 170 degrees. As the back camera 80B, a wide angle camera is adopted, for example.

The left camera 80L and the right camera 80R are mounted such that the sides of the upper rotating body 3 are included in their imaging ranges. This makes it possible for an operator of the shovel to easily recognize a positional relationship between the shovel and an object existing around the shovel by looking at images captured by the left camera 80L and the right camera 80R.

To be more specific, the left camera 80L is mounted on, for example, the stay 10a, the left front end of the cabin 10, or the left front end of the platform 3c, such that a mounting height of the left camera 80L is between a height of the platform 3c of the upper rotating body 3 and a height of an upper surface (ceiling surface) of the cabin 10. The right camera 80R is mounted on, for example, the handrail 3d, the right front end of the platform 3c, or the tool box 3e, such that a mounting height of the right camera 80R is between the height of the platform 3c of the upper rotating body 3 and the height of the upper surface of the cabin 10. FIG. 3 illustrates a state in which the left camera 80L is mounted on the stay 10a at a height approximately midway between the height of the platform 3c and the height of the upper surface of the cabin 10, and the right camera 80R is mounted on the handrail 3d at a height approximately the same as the height of the left camera 80L.

The back camera 80B is mounted such that the rear end of the upper surface of the counter weight 3b is included in its imaging range. This makes it possible for the operator of the shovel to easily recognize a positional relationship between the shovel and an object existing around the shovel by looking at an image captured by the back camera 80B.

The left camera 80L, the right camera 80R, and the back camera 80B may be mounted through respective brackets. Further, in order to prevent the cameras being damaged when not in use, such as when the shovel is transported or when a monitor is not mounted, the left camera 80L, the right camera 80R, and the back camera 80B may be foldable or may be removable.

The left camera 80L, the right camera 80R, and the back camera 80B are cameras each configured to have an image sensor such as a charge-coupled device (CCD) image sensor or a complementary metal-oxide semiconductor (CMOS) image sensor, and configured to send a captured image to a controller 30 inside the cabin 10.

The above-described shovel includes, near the left camera 80L, a left rear-view mirror that reflects the left rear view of the shovel, and also includes, near the right camera 80R, a right rear-view mirror that reflects the right rear view of the shovel. Further, the shovel includes, at the right rear end of the upper surface of the counter weight 3b, a right front-view mirror that reflects the right front view of the shovel and a rear-view mirror that reflects the rear view of the shovel.

The shovel may include at least one obstacle detecting device that detects an obstacle existing around the shovel. Examples of the obstacle include objects entering a predetermined range around the shovel, such as construction equipment, vehicles, people, buildings, and peripheral facilities. For example, the obstacle detecting device is mounted on each of the right side, the left side, and the rear side of the upper rotating body 3 so as to detect obstacles existing on the right side, the left side, and the rear side of the shovel. For example, the obstacle detecting device is configured with millimeter wave radar, a stereo camera, an ultrasonic sensor, and an infrared sensor. The obstacle detecting device may detect an obstacle by processing an image captured by a monocular camera. In this case, the obstacle detecting device may use the left camera 80L, the right camera 80R, and the back camera 80B, which function as imaging devices.

Figure 4:
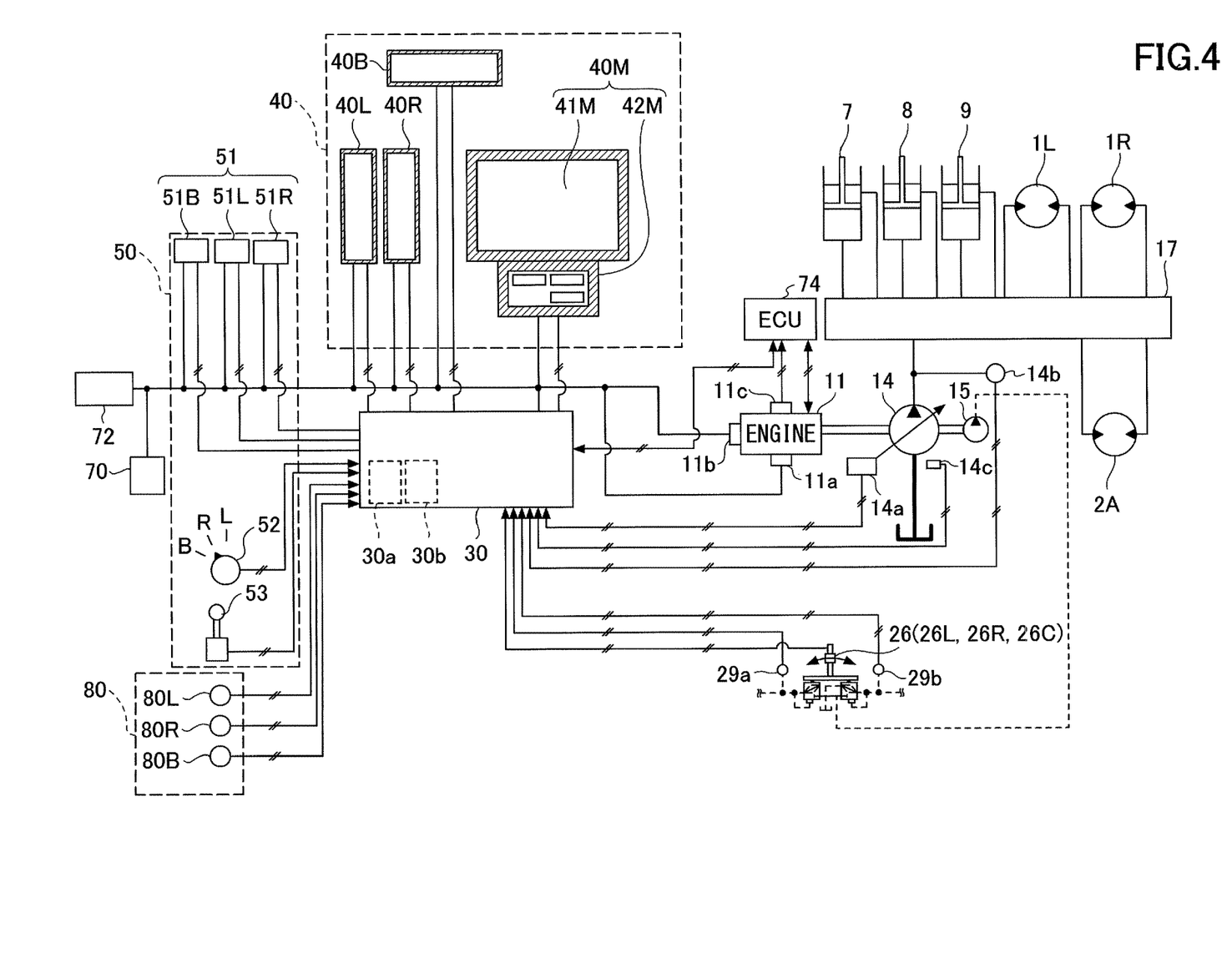
FIG. 4 is a diagram illustrating a configuration example of a display system installed in the shovel of FIG. 1.

Next, referring to FIG. 4, a configuration example of a display system installed in the shovel of FIG. 1 will be described. FIG. 4 is a block diagram illustrating the configuration example of the display system. The display system is mainly configured with the controller 30, a display device 40, an adjustment system 50, an imaging device 80, and the like. The display device 40 includes a main monitor 40M, a left monitor 40L, a right monitor 40R, and a back monitor 40B. The imaging device 80 includes a left camera 80L, a right camera 80R, and a back camera 80B.

The controller 30 is a control unit that controls the display device 40. The controller 30 is configured with a processing device including a CPU and an internal memory 30a. Various types of functions of the controller 30 are performed by causing the CPU to execute programs stored in the internal memory.

The display device 40 displays screen data including various types of information in accordance with an instruction from the controller 30. For example, the display device 40 is a liquid crystal display coupled to the controller 30. For example, the display device 40 is coupled to the controller 30 via a communication network such as a controller area network (CAN) or via a dedicated line network.

In the present embodiment, the controller includes a screen generating unit 30b that generates screen data displayed on the display device 40. The screen generating unit 30b generates screen data based on, for example, image data obtained from the imaging device 80.

To be more specific, the screen generating unit 30b generates, based on images captured by the plurality of cameras, screen data displayed on the main monitor 40M. The main monitor 40M includes an image display unit 41M and a switch panel 42M. The switch panel 42M is a switch panel that includes various types of hardware switches.

For example, the screen generating unit 30b generates a synthetic image based on images captured by at least two of the back camera 80B, a left-side camera, and a right-side camera, and causes the image display unit 41M to display screen data including the generated synthetic image. The left-side camera is a camera different from the left camera 80L and is mounted on the left end of the upper surface of the cover 3a. Similarly, the right-side camera is a camera different from the right camera 80R and is mounted on the right end of the upper surface of the cover 3a. The screen generating unit 30b may cause the image display unit 41M to display screen data including an image captured by any of the back camera 80B, the left-side camera, and the right-side camera.

Further, among various types of data externally input, the screen generating unit 30b converts data to be displayed on the image display unit 41M into an image signal. The data externally input into the controller 30 includes data indicating a temperature of engine cooling water, data indicating a temperature of hydraulic oil, and data indicating the remaining amount of aqueous urea solution, and data indicating the remaining amount of fuel, for example. The screen generating unit 30b outputs the converted image signal to the main monitor 40M, and causes the image display unit 41M of the main monitor 40M to display screen data including the synthetic image and the various data.

Further, the screen generating unit 30b generates a mirror image from an image captured by the left camera 80L, and causes the left monitor 40L to continuously display the generated mirror image. Accordingly, the left monitor 40L functions as if the left monitor 40L were a mirror. The configuration that causes the left monitor 40L to "continuously display" the generated mirror image includes a configuration that causes the left monitor 40L to display an image captured by the left camera 80L at all times, but does not exclude a configuration that causes the left monitor 40L to temporarily display another image only for a short period of time.

Similarly, the screen generating unit 30b causes the right monitor 40R to continuously display a mirror image generated from an image captured by the right camera 80R, and causes the back monitor 40B to continuously display a mirror image generated from an image captured by the back camera 80B. Accordingly, the right monitor 40R and the back monitor 40B respectively function as if the right monitor 40R and the back monitor 40B were mirrors.

The controller 30 may determine whether an obstacle enters a predetermined range around the shovel or whether an obstacle exists in the predetermined range. When it is determined that the obstacle enters the predetermined range or it is determined that the obstacle exists in the predetermined range, a warning, a voice message, or the like may be output. For example, when the obstacle detecting device detects an obstacle on the left side of the shovel, an alarm sound may be output from a built-in speaker of the left monitor 40L. Alternatively, a warning sound may be output from another speaker disposed on the left side of an operator's seat. Similarly, when the obstacle detecting device detects an obstacle on the right side of the shovel, a warning sound may be output from a built-in speaker of the right monitor 40R. Alternatively, a warning sound may be output from another speaker disposed on the right side of the operator's seat. The same applies when an obstacle exiting on the rear side of the shovel is detected.

Further, the screen generating unit 30b connects the back camera 80B, the left camera 80L, and the right camera 80R to the back monitor 40B, the left monitor 40L, and the right monitor 40R in one-to-one correspondence. Thus, it is possible to display large size images on the respective monitors, compared to when images captured by a plurality of cameras are displayed on a single monitor. Namely, it is possible to improve visibility of images displayed on the respective monitors.

Further, the monitors forming the display device 40 may be each provided with the screen generating unit 30b. In this case, the imaging device 80 may be connected to each of the monitors. For example, when the left monitor 40L has the screen generating unit, the left camera 80L may be directly connected to the left monitor 40L.

The adjustment system 50 is a system configured to adjust directions of a plurality of cameras. In the present embodiment, the adjustment system 50 includes a drive unit 51, a selection dial 52, and an operating device 53.

The drive unit 51 is a mechanism configured to adjust directions of a plurality of cameras, and is, for example, a pan/tilt mechanism. In the case of the pan/tilt mechanism, the drive unit 51 is configured with, for example, an electric motor that rotates a camera around a vertical axis and an electric motor that rotates a camera around a horizontal axis. Further, the drive unit 51 may also have a mechanism configured to adjust the zoom magnification of each of the cameras. In the present embodiment, the drive unit 51 includes a left drive unit 51L that adjusts a direction of an optical axis of the left camera 80L, a right drive unit 51R that adjusts a direction of an optical axis of the right camera 80R, and a back drive unit 51B that adjusts a direction of an optical axis of the back camera 80B.

The selection dial 52 is a dial configured to select a camera whose direction is to be adjusted, and is provided in the cabin 10. For example, the selection dial 52 is provided such that the operator can select, as a camera whose direction is to be adjusted, one of the left camera 80L, the right camera 80R, and the back camera 80B. The selection dial 52 sends information for identifying the selected camera to the controller 30. FIG. 4 illustrates a state in which the right camera 80R is selected by the selection dial 52.

The operating device 53 is a device configured to operate the drive unit 51 corresponding to the camera selected by the selection dial 52, and is provided in the cabin 10. In the present embodiment, the operating device 53 is a D-pad. The operator uses the D-pad to operate the drive unit 51. For example, when the right camera 80R is selected by the selection dial 52, the operating device 53 functions as a D-pad for operating the right drive unit 51R. In this case, the operator inclines the optical axis of the right camera 80R upward by clicking an up button of the D-pad, and inclines the optical axis of the right camera 80R leftward by clicking a left button of the D-pad. Also, the operating device 53 may include an operating unit such as a button and a switch for adjusting the zoom magnification of each of the cameras.

Further, the operating device 53 may be configured with a touch panel, or may be configured with a motion sensor that detects movements of the operator's fingers or hands without contact. In the case of the motion sensor, even if the operator's fingers are dirty, the operator can adjust directions of the cameras without dirtying the operation unit. Also, functions of the selection dial 52 may be integrated into the operating device 53.

The adjustment system 50 may be used to adjust directions of each of the left rear-view mirror, the right rear-view mirror, the right front-view mirror, and the rear-view mirror. In this case, the adjustment system 50 may include a mirror drive unit, a mirror selection dial, and a mirror operating device. The mirror selection dial and the mirror operating device may be integrated into the selection dial 52 and the operating device 53, respectively. Further, in order to aid the operator in selecting a mirror and a camera by using the dial, instruction stickers that indicate mounting positions of the mirrors and the cameras, associated with symbols such as letters A through G, may be provided in the cabin 10. In this case, dial scales are denoted by the symbols such as alphabets A through G.

The adjustment system 50 allows the operator of the shovel to adjust directions of the cameras while sitting on the operator's seat 90. Further, when the adjustment system 50 is adopted for the mirrors, the operator can adjust directions of the mirrors while sitting on the operator's seat 90. Therefore, the operator can adjust the directions of the mirrors mounted at positions away from the operator's seat by him/herself, allowing time required for adjustment to be reduced.

The controller 30, the display device 40, the adjustment system 50, and the imaging device 80 operate by receiving supply of power from a storage battery 70. The storage battery 70 is charged by an electric generator 11a that is driven by the engine 11. The power from the storage battery 70 is also supplied to electrical equipment 72, a starter 11b of the engine 11, and the like. The starter 11b is driven by power from the storage battery 70 and starts the engine 11.

The engine 11 is coupled to a main pump 14 and a pilot pump 15, and is controlled by an engine control unit (ECU) 74. The ECU 74 sends various types of data indicating conditions of the engine 11 (such as data indicating a temperature of cooling water detected by a water temperature sensor 11c) to the controller 30. The controller 30 can store the data in the internal memory 30a and display the data on the display device 40 at an appropriate timing.

The main pump 14 supplies hydraulic oil to the control valve 17 via a high-pressure hydraulic line. In the present embodiment, the main pump 14 is a variable volume swash plate type hydraulic pump. A discharge flow rate of the main pump 14 is controlled by a regulator 14a. The regulator 14a increases or decreases the discharge flow rate of the main pump 14 in accordance with an instruction from the controller 30, for example. Further, the regulator 14a sends data indicating a tilt angle of the swash plate to the controller 30. A discharge pressure sensor 14b sends data indicating a discharge pressure of the main pump 14 to the controller 30. A pipe line between a tank storing hydraulic oil suctioned by the main pump 14 and the main pump 14 is provided with an oil temperature sensor 14c. The oil temperature sensor 14c sends data indicating a temperature of hydraulic oil flowing in the pipe line to the controller 30.

The pilot pump 15 supplies hydraulic oil to various types of hydraulic control devices via a pilot line. The pilot pump 15 is, for example, a fixed volume hydraulic pump.

The control valve 17 is a hydraulic control unit that controls a hydraulic system installed in the shovel. The control valve 17 selectively supplies hydraulic oil, discharged from the main pump 14, to a left-side traveling hydraulic motor 1L, a right-side traveling hydraulic motor 1R, a rotating hydraulic motor 2A, the boom cylinder 7, the arm cylinder 8, the bucket cylinder 9, and the like (hereinafter collectively referred to as "hydraulic actuators").

An operating device 26 is used to operate the hydraulic actuators. In the present embodiment, the operating device 26 includes a left operation lever 26L, a right operation lever 26R, and a travelling lever 26C. When the operating device 26 is operated, hydraulic oil is supplied to pilot ports of flow rate control valves corresponding to the respective hydraulic actuators. The hydraulic oil is supplied to each of the pilot ports at a pressure (pilot pressure) in accordance with an operation (operation directions and operation amounts) through the operating device 26.

Pressure sensors 29a and 29b detect a pilot pressure when the operating device 26 is operated, and send data indicating the detected pilot pressure to the controller 30. The controller 30 detects the operation of the operating device 26 based on the pilot pressure detected by the pressure sensors 29a and 29b.

Figure 5:
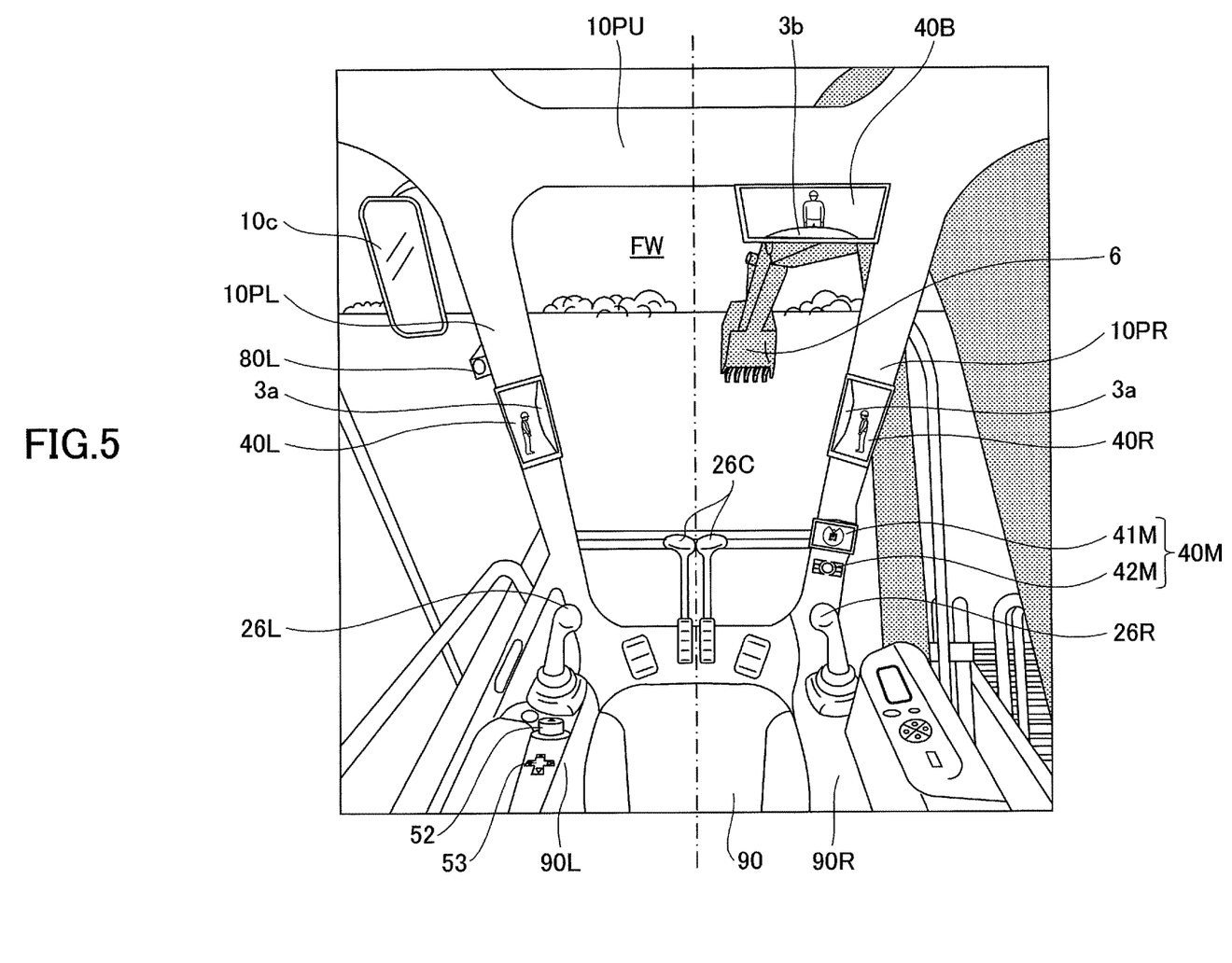
FIG. 5 is a perspective view illustrating the inside of a cabin of the shovel of FIG. 1.

Next, referring to FIG. 5, an effect of the display system will be described. FIG. 5 is a perspective view illustrating the inside of the cabin 10 when viewed forward from the operator's seat in the cabin 10.

As illustrated in FIG. 5, the operator's seat 90 is provided in the cabin 10. Further, a left console 90L is provided on the left side of the operator's seat 90, and a right console 90R is provided on the right side of the operator's seat 90. The left operation lever 26L is mounted on the front end portion of the left console 90L, and a right operation lever 26R is mounted on the right console 90R at a position corresponding to the left operation lever 26L. The main monitor 40M is mounted above the front end portion of the right console 90R.

In the cabin 10, the left monitor 40L is mounted on a left pillar 10PL, and the right monitor 40R is mounted on a right pillar 10PR. Desirably, the left monitor 40L is mounted at a height higher than a height of the main monitor 40M and lower than a height of a left rear-view mirror 10c. The term "height" refers to, for example, a vertical distance from the ground. Also, desirably, the left monitor 40L is mounted at a height approximately the same as a height of the left camera 80L. Similarly, the right monitor 40R is mounted at a height higher than the height of the main monitor 40M and lower than the height of the left rear-view mirror 10c. Also, desirably, the right monitor 40R is mounted at a height approximately the same as a height of the right camera 80R.

The back monitor 40B is mounted on an upper portion of the right pillar 10PR so as to be disposed along a front side ceiling frame 10PU. The back monitor 40B may be mounted on an upper portion of the left pillar 10PL so as to be disposed along the front side ceiling frame 10PU.

In this way, the left monitor 40L is disposed as if the left side of the field of view of the shovel's operator looking forward while sitting on the operator's seat were a left rear-view mirror. Further, the right monitor 40R is disposed as if the right side of the field of view were a right rear-view mirror. Further, the back monitor 40B is disposed as if the upper side of the field of view were a rear-view mirror. Accordingly, the operator of the shovel can intuitively recognize an image displayed on the left monitor 40L as a mirror image of the left rear of the shovel. Similarly, the operator can intuitively recognize an image displayed on the right monitor 40R as a mirror image of the right rear of the shovel, and recognize an image displayed on the back monitor 40B as a mirror image of the rear of the shovel.

The images displayed on the left monitor 40L, the right monitor 40R, and the back monitor 40B correspond to images captured by the left camera 80L, the right camera 80R, and the back camera 80B, respectively. Namely, the left monitor 40L, the right monitor 40R, and the back monitor 40B display different directions. Further, displays of the left monitor 40L, the right monitor 40R, and the back monitor 40B are started at the same time when the main monitor 40M is activated upon the key being turned on by the operator. Alternatively, the displays of the left monitor 40L, the right monitor 40R, and the back monitor 40B may be started at the same time when the engine 11 is started.

Further, the left monitor 40L, the right monitor 40R, and the back monitor 40B are mounted without obstructing the operator's field of view through a front window FW. In the present embodiment, the left monitor 40L and the right monitor 40R respectively have a width that fits in a width of the left pillar 10PL and of the right pillar 10PR, and the back monitor 40B is mounted at the top-right corner of the front window FW. However, the left monitor 40L and the right monitor 40R may respectively have a width wider than the width of the left pillar 10PL and of the right pillar 10PR, and the back monitor 40B may have a size that fits in the front side ceiling frame 10PU. Further, the left monitor 40L, the right monitor 40R and the back monitor 40B are mounted at positions that do not obstruct the opening/closing of the front window FW.

A screen size and resolution of each of the left monitor 40L, the right monitor 40R, and the back monitor 40B are selected such that an image of a person existing in a predetermined range (for example, 12 m) from the shovel can be displayed on each of the monitors in a size larger than a predetermined size (for example, 7 mm×7 mm). For example, for each of the left monitor 40L and the right monitor 40R, a monitor having a screen size of at least 7 inches is adopted, and desirably, a monitor having a screen size of 7 inches or 8 inches is adopted.

Further, the left monitor 40L and the right monitor 40R are mounted at the same height relative to a reference horizontal surface. The reference horizontal surface is, for example, the ground where the shovel is located. In the present embodiment, the left monitor 40L and the right monitor 40R are mounted so as to be symmetric about a centerline of the cab as illustrated by a dash-dot line in FIG. 5.

Further, each mounting angle of the left monitor 40L, the right monitor 40R, and the back monitor 40B may be adjusted according to the body shape or the working posture of the operator sitting on the operator's seat 90.

As illustrated in FIG. 5, the operator's seat 90 is provided at the center of the cabin 10. The left operation lever 26L and the right operation lever 26R are provided at the sides of the operator's seat 90. Accordingly, the operator can perform excavation work by operating the left operation lever 26L with the left hand and operating the right operation lever 26R with the right hand so as to move the bucket 6 to a desired position while sitting on the operator's seat 90.

The image display unit 41M and the switch panel 42M of the main monitor 40M are disposed at the right front of the operator's seat 90. The operator of the shovel can identify the operating condition of the shovel by looking at the image display unit 41M. In the example of FIG. 5, the image display unit 41M displays a bird's eye image. The bird's eye image is an example of a synthetic image generated from images captured by the back camera 80B, the left-side camera, and the right-side camera. To be more specific, the bird's eye image is a view-point conversion image representing a view around the shovel when seen from a virtual viewpoint right above the shovel.

The left monitor 40L is mounted on the left pillar 10PL, and the right monitor 40R is mounted on the right pillar 10PR. The left monitor 40L and the right monitor 40R are mounted at positions that allow the operator to see the left monitor 40L and the right monitor 40R in the peripheral field of view while seeing the bucket 6 in the center field of view through the front window FW of the cabin 10. Accordingly, when the operator performs excavation work, the operator can see left rear and right rear views of the shovel displayed on the left monitor 40L and the right monitor 40R in the peripheral field of view, while seeing the bucket 6 in the center field of view without moving the line of sight.

The selection dial 52 and the operating device 53 are disposed on the left console 90L. In order to change a range in which the left monitor 40L displays an image of the left rear of the shovel, the operator operates the selection dial 52 and selects the left camera 80L. Subsequently, the operator operates the operating device 53 and changes the direction of the left camera 80L, such that the range displayed on the left monitor 40L can be changed. A range displayed on the left rear-view mirror 10c may be changed in the same way.

Figure 6:
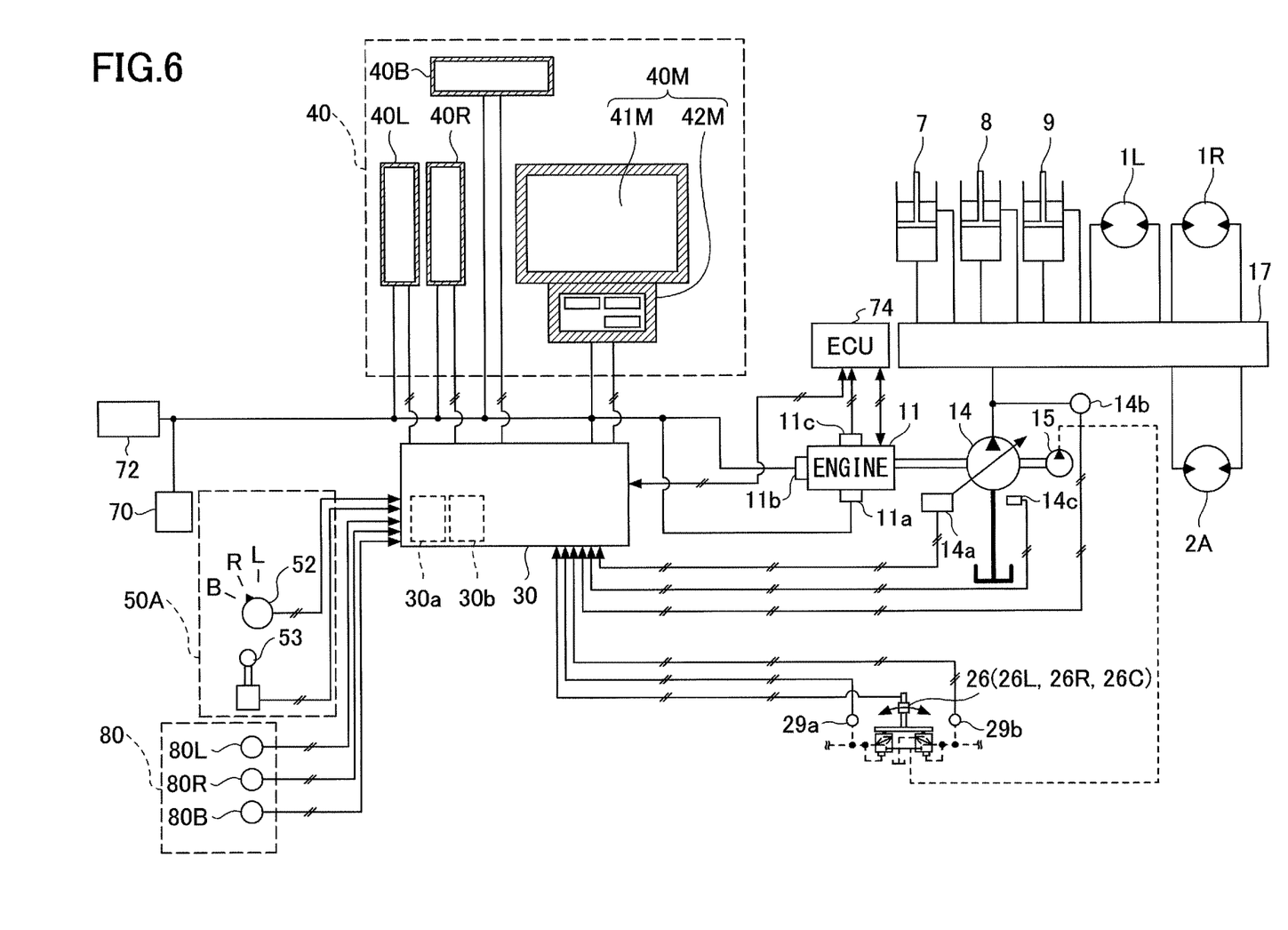
FIG. 6 is a diagram illustrating another configuration example of the display system.

Next, referring to FIG. 6, another configuration example of the display system installed in the shovel of FIG. 1 will be described. FIG. 6 is a block diagram illustrating the other configuration example of the display system. In the example of FIG. 6, wide angle cameras are adopted as not only the back camera 80B, but also as the left camera 80L and the right camera 80R. Therefore, the left monitor 40L displays a selected portion of an image captured by the left camera 80L, and the right camera 80R displays a selected portion of an image captured by the right camera 80R. For example, even when the right camera 80R has the horizontal angle of view α3 (see FIG. 2), the right monitor 40R displays only a portion corresponding to the horizontal angle of view α2.

The display system of FIG. 6 is similar to the display system of FIG. 4, except that the drive unit 51 is omitted. Specifically, an adjustment system 50A is similar to the adjustment system 50 of FIG. 4, except that, instead of the drive unit 51, the controller 30 simulates adjustment of directions of cameras by performing image processing. Therefore, descriptions of the same elements will be omitted and only differences will be described in detail.

In the present embodiment, the operating device 53 is a D-pad. The operator operates the D-pad to change a range displayed on a monitor. The range displayed on the monitor refers to a portion of an image that is captured by a camera and is used to generate a mirror image. For example, when the right camera 80R is selected by the selection dial 52, the operating device 53 functions as a D-pad for changing a range of a mirror image displayed on the right monitor 40R. The mirror image is generated from an image captured by the right camera 80R. In this case, for example, of an entire image captured by the right camera 80R, the operator moves a range of the image displayed on the right monitor 40R upward by pressing the up button of the D-pad. Alternatively, of the entire image captured by the right camera 80R, the operator moves a range of the image displayed on the right monitor 40R leftward by pressing the left button of the D-pad. In this way, the controller 30 adjusts a range displayed on the right monitor 40R in accordance with the operation performed through the operating device 53. To be more specific, when the screen generating unit 30b of the controller 30 has generated a mirror image by extracting, from an image captured by the right camera 80R having the horizontal angle of view α3, a portion of the image corresponding to the horizontal angle of view α2, the screen generating unit 30b of the controller 30 extracts another portion of the image corresponding to the horizontal angle of view α2. Subsequently, the screen generating unit 30b of the controller 30 generates a mirror image of the newly extracted portion of the image, and causes the right monitor 40R to display the generated mirror image. Namely, both the extracted portions correspond to the horizontal angle of view α2, and a direction of a bisector of the horizontal angle of view α2 differs between the extracted portions.

In this configuration, the display system of FIG. 6 can exhibit a similar effect to that of the display system of FIG. 4. Namely, it is possible to obtain a similar effect to the embodiment in which directions of the cameras are adjusted by the drive unit 51.

Although the shovel has been described based on the embodiments, the present invention is not limited to the above-described embodiment. Various modifications and variations may be made without departing from the scope of the present invention.

What is claimed is:

1. A shovel comprising:
   a lower traveling body;
   an upper rotating body rotatably mounted on the lower traveling body;
   a cab mounted on the upper rotating body;
   an operator's seat in the cab;
   a left operation lever provided on a left side of the operator's seat;
   a right operation lever provided on a right side of the operator's seat;
   a left monitor mounted on a left pillar in front of the left operation lever inside the cab;
   a right monitor mounted on a right pillar in front of the right operation lever inside the cab;
   a main monitor placed in front and to a right of the operator's seat;
   a left camera mounted on a left front end of the upper rotating body to have a view toward an area on a left rear side of the upper rotating body, and configured to capture an image of the area on the left rear side of the upper rotating body;
   a right camera mounted on a right front end of the upper rotating body to have a view toward an area on a right rear side of the upper rotating body, and configured to capture an image of the area on the right rear side of the upper rotating body;

a back camera mounted on a rear end of the upper rotating body; and a hardware processor configured to control both the left monitor and the right monitor, wherein the hardware processor is configured to cause the left monitor to continuously display a mirror image generated from the image captured by the left camera, and to cause the right monitor to continuously display a mirror image generated from the image captured by the right camera, the right monitor is placed in front and to the right of the operator's seat and is mounted at a position higher than the main monitor, the main monitor being configured to display at least one of various operation data input to the hardware processor and a synthetic image generated from images captured by at least two of the left camera, the right camera, and the back camera, and a horizontal angle of view of each of the left camera and the right camera is narrower than a horizontal angle of view of the back camera.

2. The shovel according to claim 1, wherein the left monitor and the right monitor are mounted at a same height relative to a reference horizontal surface.

3. The shovel according to claim 1, wherein a screen size of each of the left monitor and the right monitor is at least 7 inches.

4. The shovel according to claim 1, further comprising:
a back monitor mounted on an upper portion of the right pillar so as to be disposed along a front side ceiling frame inside the cab,
wherein the back camera is configured to capture an image of an area on a rear side of the upper rotating body, and
wherein the hardware processor is configured to cause the back monitor to continuously display a mirror image generated from the image captured by the back camera.

5. The shovel according to claim 1, wherein a mounting height of each of the left camera and the right camera is between a height of a platform of the upper rotating body and a height of an upper surface of the cab.

6. The shovel according to claim 1, wherein the horizontal angle of view of each of the left camera and the right camera is 20 to 70 degrees.

7. The shovel according to claim 1, further comprising:
a camera drive mechanism configured to adjust a direction of each of a plurality of cameras including the back camera, the left camera and the right camera,
wherein the camera drive mechanism is operated through an operating device disposed inside the cab.

8. The shovel according to claim 1, wherein the hardware processor is configured to adjust a range displayed on each of the left monitor and the right monitor in accordance with an operation through an operating device disposed inside the cab.

9. The shovel according to claim 1, wherein the mirror image generated from the image captured by the left camera is a mirror image of at least a part of the area on the left rear side of the upper rotating body, and the mirror image generated from the image captured by the right camera is a mirror image of at least a part of the area on the right rear side of the upper rotating body.

10. The shovel according to claim 1, wherein the hardware processor is configured to cause the left monitor to constantly display the mirror image generated from the image captured by the left camera while the left monitor is in operation, and to cause the right monitor to constantly display the mirror image generated from the image captured by the right camera while the right monitor is in operation.

11. The shovel according to claim 1, wherein the left monitor and the right monitor are mounted at positions that do not obstruct opening or closing of a front window of the cab.

12. The shovel according to claim 1, wherein the left monitor and the right monitor include respective built-in speakers.

13. The shovel according to claim 12, wherein the hardware processor is configured to output an alarm sound from the built-in speaker of the left monitor in response to detection of an obstacle on a left side of the shovel, and to output an alarm sound from the built-in speaker of the right monitor in response to detection of an obstacle on a right side of the shovel.

14. A shovel comprising:
a lower traveling body;
an upper rotating body rotatably mounted on the lower traveling body;
a cab mounted on the upper rotating body;
an operator's seat in the cab;
a left operation lever provided on a left side of the operator's seat;
a right operation lever provided on a right side of the operator's seat;
a left monitor mounted on a left pillar in front of the left operation lever inside the cab;
a right monitor mounted on a right pillar in front of the right operation lever inside the cab;
a main monitor placed in front and to a right of the operator's seat,
a left camera mounted on a left front end of the upper rotating body to have a view toward an area on a left rear side of the upper rotating body, and configured to capture an image of the area on the left rear side of the upper rotating body;
a right camera mounted on a right front end of the upper rotating body to have a view toward an area on a right rear side of the upper rotating body, and configured to capture an image of the area on the right rear side of the upper rotating body;
a back camera mounted on a rear end of the upper rotating body;
a hardware processor configured to control both the left monitor and the right monitor, the hardware processor being configured to cause the left monitor to continuously display a mirror image generated from the image captured by the left camera, and to cause the right monitor to continuously display a mirror image generated from the image captured by the right camera; and
an operating device configured to change a range of the mirror image displayed on the left monitor and a range of the mirror image displayed on the right monitor,
wherein the right monitor is placed in front and to the right of the operator's seat and is mounted at a position higher than the main monitor, the main monitor being configured to display at least one of various operation data input to the hardware processor and a synthetic image generated from images captured by at least two of the left camera, the right camera, and the back camera, and a horizontal angle of view of each of the left camera and the right camera is narrower than a horizontal angle of view of the back camera.

* * * * *